US005437808A

United States Patent [19]

Weltman et al.

[11] Patent Number: 5,437,808

[45] Date of Patent: Aug. 1, 1995

[54] NONFLAMMABLE MILD ODOR SOLVENT CLEANER

[75] Inventors: Henry J. Weltman; Tony L. Phillips, both of Fort Worth, Tex.

[73] Assignee: Lockheed Corporation, Fort Worth, Tex.

[21] Appl. No.: 92,209

[22] Filed: Jul. 15, 1993

Related U.S. Application Data

[63] Continuation-in-part of Ser. No. 927,921, Aug. 6, 1992, abandoned, which is a continuation-in-part of Ser. No. 743,258, Aug. 9, 1991, Pat. No. 5,188,754, which is a continuation-in-part of Ser. No. 686,180, Apr. 16, 1991, abandoned, which is a continuation-in-part of Ser. No. 614,228, Nov. 15, 1990, abandoned.

[51] Int. Cl.[6] ........................ C23G 5/032; G11D 7/50; C09D 9/00

[52] U.S. Cl. .................................... 252/170; 252/142; 252/358; 252/364; 252/DIG. 8; 134/38; 134/39; 134/40

[58] Field of Search ............... 252/162, 120, 171, 364, 252/DIG. 8; 134/38, 39, 40

[56] References Cited

U.S. PATENT DOCUMENTS

| | | | |
|---|---|---|---|
| 3,870,536 | 3/1975 | Blanco et al. | 106/175 |
| 4,699,924 | 10/1987 | Durrant et al. | 514/558 |
| 4,710,479 | 12/1987 | Heller et al. | 514/221 |
| 4,929,533 | 5/1990 | Nishikawa et al. | 430/169 |
| 5,015,410 | 5/1991 | Sullivan | 252/166 |
| 5,061,605 | 10/1991 | Kawamura et al. | 430/281 |
| 5,063,138 | 11/1991 | Salamy | 430/326 |
| 5,064,442 | 11/1991 | Grollier | 8/407 |
| 5,102,654 | 4/1992 | Castrogiovanni et al. | 424/61 |
| 5,126,228 | 6/1992 | Higashi et al. | 430/272 |

FOREIGN PATENT DOCUMENTS

| | | |
|---|---|---|
| 489485 | 6/1992 | European Pat. Off. . |
| 4-323299 | 11/1992 | Japan . |

*Primary Examiner*—Richard L. Raymond
*Assistant Examiner*—B. Bembenick
*Attorney, Agent, or Firm*—Arthur F. Zobal

[57] ABSTRACT

Disclosed are three organic solvent cleaning formulations. In one embodiment, the formulation is methyl or ethyl lactate and propylene glycol methyl ether. In another embodiment, the formulation is methyl or ethyl lactate and propylene glycol propyl ether. In a third embodiment, the formulation is ethyl lactate and isoparaffins of isoundecane and isododecane with propylene glycol propyl ether added as a stabilizing agent.

5 Claims, No Drawings

NONFLAMMABLE MILD ODOR SOLVENT CLEANER

This application is a continuation-in-part of U.S. patent application Ser. No. 07/927,921, filed Aug. 6, 1992 (abandoned), which is a continuation-in-part of U.S. patent application Ser. No. 07/743,258, filed Aug. 9, 1991, now U.S. Pat. No. 5,188,754, which is a continuation-in-part of U.S. patent application Ser. No. 07/686,180, filed Apr. 16, 1991, now abandoned, which is a continuation-in-part of U.S. patent application Ser. No. 07/614,228, filed Nov. 15, 1990, now abandoned.

BACKGROUND OF THE INVENTION

1. Field of the Invention

The invention relates to organic cleaning formulations for removing soils from surfaces.

2. Description of the Prior Art

A number of cleaning formulations have been used to clean soils from surfaces. Reference is made to Table 1 of prior art cleaning formulations commercially available by others. In Table I, MEK is the abbreviation of methyl ethyl ketone and MIBK is the abbreviation of methyl isobutyl ketone. This Table lists the disadvantages inherent in each of these prior art formulations. It is seen that of the 25 prior art formulations listed, 9 of them are not efficient cleaners for a wide variety of soils; 9 of them are flammable; 11 are toxic; 11 have strong odors; 12 evaporate too slowly; 6 leave residues after drying; 2 contain water which could cause corrosion; and 13 contain ingredients which are being banned by the Federal environmental regulations. All of the 25 prior art formulations have at least one of these disadvantages.

Our U.S. patent application No. 5,188,754, entitled "Cleaning Formulation and Method That Alleviates Current Problems" discloses an improved cleaning formulation comprising a major portion of propylene glycol methyl ether acetate and a minor portion of one or more ingredients selected from the group consisting of propylene glycol methyl ether, methyl isoamyl ketone, isoparaffins, and butyl acetate. This formulation has advantages over the prior art formulations of Table I. However, a few workers in restricted work spaces using undesirable work practices have experienced discomfort due to a reported unpleasant odor from our prior formulation. The odor issue should not be overlooked since both behavioral and endocrine toxicity studies indicate that the olfactory system may have a profound effect on neurotransmitters and endocrine levels which can effect mood (i.e. productivity) and immune response (i.e. sick days).

SUMMARY OF THE INVENTION

It is an object of the invention to provide new organic solvent cleaning solutions which are particularly useful for removing soils from surfaces and which are nonflammable, have a mild odor, and a low toxicity.

It is a further object of the invention to provide new organic solvent cleaning solutions that have a low enough evaporation rate to reduce volatile emissions to the atmosphere, have a high enough evaporation rate to dry from the surface in a short period of time (the optimum evaporation rate range has been found to be between 15% and 50% of the evaporation rate of normal butyl acetate standard), evaporate completely at ambient conditions leaving no residue, contain no water and conform to government environmental regulations.

The cleaning formulation of the invention in one aspect comprises a first ingredient selected from the group consisting of methyl lactate and ethyl lactate and a second ingredient selected from the group consisting of propylene glycol methyl ether and propylene glycol propyl ether.

In one embodiment, the second ingredient is propylene glycol methyl ether. In this embodiment, the methyl or ethyl lactate is present in an optimum concentration range of about 45–60% by volume and the propylene glycol methyl ether is present in an optimum concentration range of about 40–55% by volume.

In another embodiment, the second ingredient is propylene glycol propyl ether. In this embodiment, the methyl or ethyl lactate is present in an optimum concentration range of about 25–75% by volume and the propylene glycol propyl ether is present in an optimum concentration range of about 25–75% by volume.

In another aspect of the invention, the cleaning formulation comprises ethyl lactate, isoparaffins of isoundecane (C11) and isododecane (C12) in a ratio that has a boiling range of about 354–372 degrees Fahrenheit, and a stabilizing agent to make the ethyl lactate and isoparaffins miscible. In the embodiment disclosed, the stabilizing agent is propylene glycol propyl ether. In this embodiment of the invention, the ethyl lactate is present in an optimum concentration range of about 50–70% by volume, the propylene glycol propyl ether is present in an optimum concentration range of about 10–25% by volume, and the isoparaffins are present in an optimum concentration range of about 15–25% by volume.

DESCRIPTION OF THE PREFERRED EMBODIMENTS

The primary object of the formulation of the invention is to remove soils from surfaces. This is done to improve the appearance of the surfaces and in some cases to prepare the surfaces for application of coatings such as paints, sealants, or adhesives. "Soils" is used in this context to include any contaminant such as dirt, oils, greases, fingerprints, pencil marks, ink and dye marks, uncured resins, and others. If these contaminants are not thoroughly removed prior to application of coatings (or if the cleaner has not completely dried, leaving no residue) the coating may not adhere to the surface. This could cause minor inconveniences, such as the peeling of paint, or major catastrophes, such as an airplane falling apart during flight.

The importance of a mild odor has been discussed previously.

Another object of the invention is to provide a formulation that is nonflammable. This is important because many industrial facilities are not equipped to safely handle flammable liquids. Special explosion proof electrical outlets and lights must be provided as well as other safeguards. Use of a nonflammable cleaner alleviates the problem.

The toxicity of the cleaner formulation is of extreme importance to protect the health and well-being of personnel using the material. Various government and industrial organizations express toxicity in different ways. The Occupational Safety and Health Administration (OSHA) expresses toxicity in terms of Threshold Limit Value-Time Weighted Average (TLV-TWA) which is the concentration of vapor in parts per million parts of air to which person can be exposed for eight hours per day without adverse effects. The American Conference of Governmental Industrial Hygienists (ACGIH) expresses the same exposure as Permissible Exposure Limit (PEL). The American Industrial Hygiene Association expresses the exposure limit as Workplace Environmental Exposure Level (WEEL). Chemical manufacturers sometimes assign their own exposure limits to their products. In this application, toxicity is expressed as Exposure Limit, which is the concentration of vapor in parts per million to which personnel may be exposed for an average of eight hours per day without averse effects. A material with an exposure limit of 50 parts per million is considered toxic. A material with an exposure limit of 100 parts per million is moderately toxic. A material with an exposure limit of 150 has a low toxicity. It is an object of this invention to provide a cleaner formulation with an exposure limits of 150 parts per million or higher.

The evaporation rate of the formulations is another critical property. If the cleaner evaporates too fast, excessive volatile organic compounds (VOC's) are released to the atmosphere which creates smog; if the cleaner evaporates too slow from a surface, the cleaning process takes too much time. Evaporation rates are expressed as a percentage of the evaporation time of normal butyl acetate as a reference. The optimum range of evaporation rates for cleaner formulations is between 15% and 50% of the evaporation rate for normal butyl acetate.

It is important that the cleaning formulation evaporate to dryness at ambient conditions and leave no residue. A residue would affect adhesion of coatings applied to the cleaned surfaces.

The formulation should be free of water to avoid corrosion of metal surfaces upon which it is used. This is particularly important when mating surfaces are cleaned. In this case, the cleaner might get trapped between the mating surfaces for long periods of time and water would/could cause corrosion.

Regulations are being enforced by the Environmental Protection Agency (EPA), by OSHA, and by various state and local agencies to prohibit or curtail the usage of certain chemicals. Some chemicals affected by these regulations are methyl ethyl ketone, methyl isobutyl ketone, methyl chloroform, trichloroethylene, toluene, xylene, chloroflorocarbons (CFC's), and many others. An object of this invention is to provide cleaner formulations which do not contain any component banned or curtailed by any government agency.

The formulations in this invention have been designed to meet all of the objectives described above. Laboratory evaluations of various chemicals revealed that no individual compound would meet all of these objectives. It was discovered that five selected compounds came close to meeting the objectives and it was further discovered that these five compounds could be blended in specific proportions to give formulations which do meet all of the objectives. The five compounds are methyl lactate, ethyl lactate, propylene glycol methyl ether, propylene glycol propyl ether, and isoparaffins (a mixture of isoundecane and isododecane). Properties of the five chemical compounds are shown in Table II. It was discovered that when compounding these formulations, all of the blends had to contain either methyl or ethyl lactate in order to exhibit the desired properties. No combination without methyl or ethyl lactate would meet all of the objectives. The other ingredients were selected from the three other compounds, namely propylene glycol methyl ether, propylene glycol propyl ether, and isoparaffins. Three basic formulations were developed. They are (1) methyl or ethyl lactate plus propylene glycol methyl ether; (2) methyl or ethyl lactate plus propylene glycol propyl ether; and (3) ethyl lactate and isoparaffins plus propylene glycol propyl ether added as a stabilizing agent. Although all three of these formulations meet all of the objectives of the invention, there are differences between them. For example, Formulation 1 is the best when cleaning inks, dyes, and resins, but is only fair when cleaning hydrocarbon oils and greases. On the other hand, Formulation 2 is excellent for cleaning hydrocarbon oils and greases and is good for cleaning inks, dyes, and resins. Formulation 3 is not quite as good as Formulation 2 for cleaning hydrocarbons but it is less toxic, having an exposure limit of 250 parts per million. Tables III and IV show the allowable concentration range, the optimum concentration, and the characteristics of each of the three formulations.

Formulation 1 has a mild odor; is nonflammable having a flash point of about 104 degrees Fahrenheit when measured by the closed cup method; has a low toxicity as demonstrated by having an exposure limit of about 150 parts per million for an average exposure of eight hours per day; has an evaporation rate of about 25% of the evaporation rate of normal butyl acetate as a reference; evaporates completely at ambient conditions leaving no residue; and contains no water or any component being banned or regulated by any government environmental agency.

Formulation 2 has a mild odor; is nonflammable having a flash point of about 115 degrees Fahrenheit when measured by the closed cup method; has a low toxicity as demonstrated by having an exposure limit of about 200 parts per million for an average exposure of eight hours per day; has an evaporation rate of about 20% of the evaporation rate of normal butyl acetate as a reference; evaporates completely at ambient conditions leaving no residue; and contains no water or any component being banned or regulated by any government environmental agency.

Formulation 3 has a mild odor; is nonflammable having a flash point of about 115 degrees Fahrenheit when measured by the closed cup method; has a low toxicity as demonstrated by having an exposure limit of about 250 parts per million for an average exposure of eight hours per day; has an evaporation rate of about 20% of the evaporation rate of normal butyl acetate as a reference; evaporates completely at ambient conditions leaving no residue; and contains no water or any component being banned or regulated by government environmental agency.

As shown in Tables III and IV, each of the three formulations has an allowable concentration range and optimum concentration of each ingredient. These ranges were determined by laboratory experimentation. For example, the allowable concentration range for Formulation 1 is about 45–60% by volume of methyl or ethyl lactate and about 40–55% by volume of propylene glycol methyl ether. It was determined in the laboratory that if the concentration of methyl or ethyl lactate was below 45% (making the concentration of propylene glycol methyl ether above 55%) the flash point is lowered to below 100 degrees Fahrenheit and thus the formulation becomes flammable. On the other hand, if the concentration of methyl or ethyl lactate was above 60% (making the concentration of propylene glycol methyl ether below 40%) the cleaning efficiency for hydrocarbon type contaminants was reduced.

For Formulation 2, the allowable concentration range was established as 25–75% by volume of methyl or ethyl lactate and about 25–75% by volume of propylene glycol propyl ether. If the concentration of methyl or ethyl lactate was below 25% (making the concentration of propylene glycol propyl ether above 75%) the cleaning efficiency for inks and dyes was reduced. On the other hand, if the concentration of methyl or ethyl lactate was above 75% (making the concentration of propylene glycol propyl ether below 25%) the cleaning efficiency for hydrocarbon type oils and greases was reduced.

For Formulation 3, the allowable concentration range was established as about 50–70% by volume of ethyl lactate, about 10–25% by volume of propylene glycol propyl ether, and about 15–25% by volume of isoparaffins. If the concentration of ethyl lactate was below 50% the cleaning efficiency for inks, dyes, and resins would be reduced. If the concentration of ethyl lactate was above 70% the cleaning efficiency for hydrocarbon type soils would be reduced. If the concentration of propylene glycol propyl ether was below 10%, the isoparaffins would not be permanently miscible in the formulation. If the concentration of propylene glycol propyl ether was above 25%, the toxicity would be increased. If the concentration of the isoparaffins was below 15% the cleaning efficiency for hydrocarbon type soils would be reduced. If the concentration of the isoparaffins was above 25%, the isoparaffins would not be miscible in the formulation.

For Formulation 3, methyl lactate cannot be used instead of ethyl lactate because methyl lactate is not miscible with the isoparaffins, even with the addition of propylene glycol ethyl ether.

Although there are infinite variations available for the compositions of the new formulations, the ones selected exhibit the best compromise of the critical properties desired.

The development of these formulations involved a combination of theoretical considerations, assessment of physical properties by handbook reference, and laboratory evaluation. The development sequence is described below.

The first step was an assessment of the need for improved cleaning solvent formulations. A review of the prior art as described in Table I and a consumer evaluation of the formulations in our pending patent application demonstrated that improved formulations were needed.

The second step was to determine the class or classes of chemicals which would be the most promising source of components for the cleaner formulations. Classes considered were: paraffin hydrocarbons, cycloparaffins, olefins, aromatics, terpenes, halogenated hydrocarbons, nitroparaffins, organic sulfur compounds, alcohols, phenols, aldehydes, ethers, glycol ethers, ketones, acids, amines, and esters. Upon consideration of the general properties of these chemical classes and upon laboratory screening tests, some of the classes were eliminated from further consideration. For example, aromatics and halogenated hydrocarbons were eliminated because of environmental regulations. Certain classes were found to have poor cleaning efficiencies; normal paraffin hydrocarbons, alcohols, aldehydes, ethers, acids, amines.

Some classes have high toxicity and/or strong odors; cycloparaffins, olefins, nitroparaffins, organic sulphur compounds, phenols. Terpenes leave a residue on evaporation. The most promising classes were identified as branched (iso) paraffin hydrocarbons, glycol ethers, esters, and ketones.

The next step in the development was to select the most promising chemicals from each of the four promising classes listed above. This selection was based on flammability (flash points) and evaporation rates as listed in chemical handbooks. In the case of isoparaffins, compounds with ten carbon atoms (iso-decane) or less were shown to have low evaporation rates. Iso-undecane (C11) and iso-dodecane (C12) have satisfactory flash points and evaporation rates. A blend of these chemicals was selected for further consideration.

The glycol ethers of consideration included the following subclasses: ethylene glycol ethers; propylene glycol ethers; diethylene glycol ethers; and dipropylene glycol ethers. The ethylene glycol ethers are considered toxic and these were eliminated from consideration. The diethylene and dipropylene glycol ethers have too slow evaporation rates. Among the propylene glycol ethers are: propylene glycol methyl ether, propylene glycol ethyl ether, propylene glycol propyl ether, and propylene glycol butyl ethers (normal and tertiary). We attempted to obtain samples of all of these propylene glycol ethers, however, no source was found for the propylene glycol ethyl ether. Samples were obtained for the others and it was observed that the propylene glycol butyl ethers had a strong odor. The propylene glycol methyl ether had a flash point of about 90 degrees Fahrenheit. Although this is below the desired minimum of 100 degrees Fahrenheit, propylene glycol methyl ether was not rejected from consideration because of the possibility of increasing the flash point by blending it with other materials. The propylene glycol propyl ether appeared to be satisfactory in all respects, having a flash point of 119 degrees Fahrenheit, a mild odor, and a satisfactory evaporation rate.

In selecting an ester, the following sub-classes were considered: formates, acetates, propiatates, butyrates, lactates, and oxalates. Upon investigating the physical properties of these chemicals in chemical handbooks, we found that all of the formates were flammable. In the acetate sub-class, they were all flammable except methyl amyl acetate and 2-ethyl butyl acetate. So far we have not found a commercial source for these two chemicals. All of the propianates, butyrates and oxalates were either flammable or toxic except for isobutyl isobutyrate. Isobutyl isobulyrate was found to have a very strong odor. In the lactates we considered methyl lactate, ethyl lactate, butyl lactate, and amyl lactate. The methyl lactate and ethyl lactate appeared to be promising and samples were obtained; the butyl and amyl had too slow evaporation rates.

The ketones were either flammable, toxic, slow evaporation, or had strong odors and therefore none of them were selected for further consideration.

The foregoing selection process provided five chemicals for further investigation: isoparaffins (C11 and C12), propylene glycol methyl ether, propylene glycol propyl ether, methyl lactates, and ethyl lactate. The next step was to evaluate each of these materials to meet our requirements as a cleaner. None of these materials met all of those requirements. For example, the isoparaffins had poor cleaning efficiencies for inks, dyes and resins; the propylene glycol methyl ether had a flash point below 100 degrees Fahrenheit and had moderate toxicity; the propylene glycol propyl ether had only fair cleaning efficiency for inks and dyes and had moderate toxicity; the methyl lactate and ethyl lactate had poor cleaning efficiency for hydrocarbon soils.

The next step in the development was to blend the five selected chemicals in such a way to maintain their desirable properties and eliminate their undesirable properties. This required a considerable amount of laboratory experimentation. It was discovered that by combining either methyl lactate or ethyl lactate with propylene glycol methyl ether, a formulation resulted with a satisfactory flash point, cleaning efficiency, and toxicity. It was further discovered that by combining either methyl lactate or ethyl lactate with propylene glycol propyl ether a second satisfactory formulation resulted. It was discovered that by combining isoparaffins with ethyl lactate, a formulation could be obtained with a very low toxicity. It was learned, however, that ethyl lactate and the isoparaffins were not permanently miscible except by adding propylene glycol propyl ether. The ethyl lactate, propylene glycol methyl ether, and the isoparaffins were permanently miscible. This provided a third formulation.

It was also discovered that whereas propylene glycol propyl ether was effective in stabilizing miscibility of ethyl lactate and isoparaffins, propylene glycol methyl ether was ineffective for that function, especially when the solution was exposed to temperatures as low as 40 degrees Fahrenheit.

It was further discovered that methyl lactate would not mix with the isoparaffins even when propylene glycol propyl ether was used as a stabilizer.

These formulations are described in detail in Tables III and IV. It is noted that although all of them meet our requirements for a cleaning formulation, each of them has specific advantages and limitations. For example, Formulation 1 is excellent for inks and dyes while only fair for hydrocarbon soils. Formulation 2 is excellent for hydrocarbon soils. Formulation 3 is good for all types of soils and has a very low toxicity.

It is to be noted that the combinations of ingredients described above are the only ways in which the five components can be combined to produce formulations meeting the requirements specified. For example, if propylene glycol methyl ether is combined with isoparaffins, either the flash point will be below 100 degrees Fahrenheit or the cleaning efficiency will be unsatisfactory, depending on the ratio of the combination. If propylene glycol methyl ether is combined with propylene glycol propyl ether, the resulting blend is too toxic. If propylene glycol propyl ether is combined with isoparaffins, the cleaning efficiency for inks, dyes, and resins is unsatisfactory. It is seen that the vital component for all three formulations is either methyl or ethyl lactate as indicated above. Propylene glycol methyl ether is the other ingredient for Formulation 1, propylene glycol propyl ether is the other ingredient for Formulation 2, and isoparaffins are the other ingredients for Formulation 3, with propylene glycol propyl ether added for miscibility or stabilizing purposes. Thus in Formulation 3, propylene glycol propyl ether is used as a stabilizing agent or ingredient.

As thus described, the mild odor, nonflammable cleaning formulation alleviate the problems of the formulations described in our pending patent application and other prior art. They are efficient cleaners for a wide variety of soils (contaminants), have low toxicity, have mild odors, are nonflammable, have evaporation rates slow enough to prevent excessive emissions to the atmosphere yet fast enough to dry completely off the surfaces at ambient conditions, evaporate completely leaving no residue to effect adhesion of coatings applied after cleaning, do not contain water, and they do not contain components banned or regulated by any government environmental agency.

It is expected that the formulations in our U.S. Pat. No. 5,188,754, and the new formulations described in this invention will be in demand as a result of the Clean Air Act passed by Congress in 1990. This law curtails the use of such common solvent cleaners as chloroform, dichloroemethane, methyl ethyl ketone, methyl isobutyl ketone, toluene, trichloroethylene, and xylenes. Of the 25 prior art formulations shown in Table I, 13 of them contain at least one of these components being banned. Of the other 12 prior art formulations, they are either inefficient cleaners for some of the contaminants (usually inks, dyes, and resins) or they are toxic or they have strong odors, or they evaporate too slow from the surface, or they leave residues. Many of the prior art formulations have two or more of these undesirable characteristics.

It is especially important to note that all of the prior art formulations of Table I have at least one of the disadvantages described. On the other hand, the formulations of this invention do not have any of these disadvantages. Therefore, these cleaners will have wide acceptance in the aerospace and other manufacturing industries.

TABLE I

ORGANIC SOLVENT CLEANING FORMULATIONS-PRIOR ART

| COMPONENTS | DISADVANTAGES |
|---|---|
| xylene, isopropyl alcohol, normal propyl alcohol, propylene glycol methyl ether, MIBK, methyl propyl ketone, butyl acetate | flammable, toxic, strong, odor, banned chemicals |
| MEK, MIBK, isopropyl alcohol, toluene | flammable, toxic, banned chemicals |
| naphtha | inefficient cleaner, slow drying |
| MEK, MIBK | flammable, toxic, strong odor, banned chemicals |
| MEK, toluene, isopropyl alcohol | flammable, toxic, strong odor, banned chemicals |
| MEK, toluene, isopropyl alcohol, naphtha, butyl acetate | flammable, toxic, strong odor, banned chemicals |
| MEK, toluene | flammable, toxic, strong odor, banned chemicals |
| naphtha, terpenes | inefficient cleaner, slow drying, leaves residue |
| dipropylene glycol methyl ether, terpenes | slow drying, leaves residue |
| dipropylene glycol, glycol methyl ether, | slow drying |
| propylene glycol butyl ether, acetic acid ester | inefficient cleaner, slow drying |
| naphtha cyclohexene | strong odor, slow drying |
| oxy-alcohol branched esters | toxic, contains water, banned chemicals |
| MEK, isopropyl alcohol, toluene, butyl acetate, water | flammable, toxic, strong odor, banned chemicals |

TABLE I-continued

| ORGANIC SOLVENT CLEANING FORMULATIONS-PRIOR ART | |
|---|---|
| COMPONENTS | DISADVANTAGES |
| naphtha, ethyl acetate, MIBK, isopropyl alcohol, toluene | flammable, toxic, strong odor, banned chemicals |
| MIBK, MEK | flammable, toxic, strong odor, banned chemicals |
| MEK | inefficient cleaner, slow dry, residue |
| naphtha | inefficient cleaner, slow dry, residue |
| naphtha | inefficient cleaner, slow drying |
| ethyl ethoxypropianate, dipropylene glycol methyl ether, aromatic naphthas | inefficient cleaner, slow dry, residue |
| terpene, naphtha | inefficient cleaner, slow dry, residue |
| terpene, naphtha | inefficient cleaner, slow dry, residue |
| naphtha | inefficient cleaner, slow dry, residue |
| MEK, ethanoline, water, proprietary ingredient | toxic, contains water, banned chemicals |
| 1-1-1-trichloroethane (methyl chloroform) | toxic banned chemicals |
| trichloro-trifloro-ethane (CFC-113) | banned |

TABLE II

PROPERTIES OF INDIVIDUAL COMPONENTS OF NEW SOLVENT CLEANER FORMULAS

| PROPERTIES | Methyl Lactate or Ethyl Lactate | Propylene Glycol Methyl Ether | Propylene Glycol Propyl Ether | Isoparaffins |
|---|---|---|---|---|
| Cleaning Efficiency | | | | |
| Hydrocarbon Soils | Poor | Good | Excellent | Excellent |
| Inks and Dyes | Excellent | Good | Fair | Poor |
| Uncured Resins | Excellent | Good | Good | Poor |
| Flash Point, °F. | 130 | 89 | 119 | 128 |
| Toxicity, Exposure Limit, PPM | 300 | 100 | 100 | 300 |
| Evaporation Rate (Butyl Acetate = 100) | 20 | 70 | 22 | 9 |

TABLE III

COMPOSITIONS AND PROPERTIES OF NEW SOLVENT CLEANER FORMULATIONS

| | Concentration, % by volume | | | |
|---|---|---|---|---|
| | Formulation 1 | | Formulation 2 | |
| | Range | Optimum | Range | Optimum |
| Methyl Lactate or Ethyl Lactate | 45–60 | 50 | 25–75 | 50 |
| Propylene Glycol Methyl Ether | 40–55 | 50 | | |
| Propylene Glycol Propyl Ether | | | 25–75 | 50 |
| Cleaning Efficiency | | | | |
| Hydrocarbon Soils | Fair | | Excellent | |
| Inks and Dyes | Excellent | | Good | |
| Uncured Resins | Excellent | | Good | |
| Flash Point, °F. | 104 | | 115 | |
| Toxicity, Exposure Limit, PPM | 150 | | 200 | |
| Evaporation Rate (Butyl Acetate = 100) | 25 | | 20 | |

TABLE IV

COMPOSITIONS AND PROPERTIES OF NEW SOLVENT CLEANER FORMULATIONS

| | Concentration, % by volume | |
|---|---|---|
| Ethyl Lactate | 50–70 | 65 |
| Isoparaffins | 15–25 | 20 |
| Propylene Glycol Propyl Ether (Stabilizer) | 10–25 | 15 |
| Cleaning Efficiency | | |
| Hydrocarbon Soils | Good | |
| Inks and Dyes | Good | |
| Uncured Resins | Good | |
| Flash Point, °F. | 115 | |
| Toxicity, Exposure Limit, PPM | 250 | |
| Evaporation Rate (Butyl Acetate = 100) | 20 | |

Additional formulations have been developed in which the concentration ranges of Formulations 1, 2, and 3 have been extended beyond their optimum ranges. Although these extended ranges result in formulations with deficiencies in some of their properties, they are still useful for applications where these deficiencies are not critical. For example, many industrial facilities are permitted to use flammable solvents for cleaners. The extended ranges are described in Tables V, VI, and VII.

Table V shows the composition and properties of the extended range of Formulation 1 which is a mixture of methyl lactate or ethyl lactate and propylene glycol methyl ether. The Table is divided into three sections, representing three concentration ranges. It is noted that the middle range (about 45–60% methyl or ethyl lactate and about 40–55% propylene glycol methyl ether) is the optimum concentration range previously described for Formulation 1. This range may be extended to concentrations of about 20–44% methyl or ethyl lactate and about 56–80% propylene glycol methyl ether. This lower concentration of methyl or ethyl lactate and higher concentration of propylene glycol methyl ether causes the flash point to be reduced so that the solution is flammable. The cleaning efficiencies for inks, dyes and uncured resins are also reduced, but the cleaning efficiency for hydrocarbon soils is improved. The toxicity is slightly increased. Further decreases in the concentration of methyl or ethyl lactate would increase the flammability and toxicity and further reduce the cleaning efficiency. The concentration of methyl or ethyl lactate can also be increased to a range of about 61–80% and the propylene glycol methyl ether reduced to a range of about 20–39%. This causes the cleaning efficiency for hydrocarbon soils to be reduced and the toxicity to be decreased. Further increases in the concentration of ethyl or methyl lactate would cause further reduction in the cleaning efficiency of hydrocarbon soils. Thus in this embodiment, the concentrations range from about 20–80% for methyl or ethyl lactate and from about 20–80% for propylene glycol methyl ether.

Table VI shows the composition and properties of the extended range of Formulation 2, which is a mixture of methyl or ethyl lactate and propylene glycol propyl ether. The Table is divided into three sections, representing three concentration ranges. It is noted that the middle range (about 25–75% methyl or ethyl lactate and about 25–75% propylene glycol propyl ether) is the optimum concentration range previously described for Formulation 2. This range may be extended to concentrations of about 20–24% methyl or ethyl lactate and about 76–80% propylene glycol propyl ether. This reduced concentration of methyl or ethyl lactate and increased concentration of propylene glycol propyl ether causes the cleaning efficiency for inks and dyes to be reduced and the toxicity to increase. Further decreases in the concentration of methyl or ethyl lactate would further decrease the cleaning efficiency for inks and dyes. The concentration of methyl or ethyl lactate may be increased to a range of about 76–80%. This causes the cleaning efficiency for hydrocarbon soils to be reduced. The increased concentration of lactates also causes the toxicity to be reduced. Further increases in the concentration of methyl or ethyl lactate would further reduce the cleaning efficiency for hydrocarbon soils. Thus in this embodiment, the concentrations range from about 20–80% for methyl or ethyl lactate and from about 20–80% for propylene glycol propyl ether.

Table VII shows the composition and properties of the extended range of Formulation 3, which is a mixture of ethyl lactate and isoparaffins, stabilized with propylene glycol propyl ether. The Table is divided into three sections, representing three concentration ranges. It is noted that the middle range (about 50–70% ethyl lactate, about 15–25% isoparaffins, and about 10–25% propylene glycol propyl ether stabilizer) is the optimum concentration range previously described for Formulation 3. This range may be extended to concentrations of about 20–49% ethyl lactate and about 26–80% isoparaffins. It has been found that the propylene glycol propyl ether stabilizer may not be effective for this combination if the concentration of isoparaffins are over 25% by volume, so even with 25% stabilizer, the solution will separate into two layers. With this situation, there would be no value to adding the stabilizer and the solution would have to be continually agitated during use. Another disadvantage of this concentration range is reduced cleaning efficiency for inks, dyes, and uncured resins. If the concentration of ethyl lactate is increased to about 71–80% and the concentration of isoparaffins reduced to about 5–19% the solution is stable at room temperature without stabilizer, but some stabilizer is needed at reduced temperatures. This concentration range also has a reduced cleaning efficiency for hydrocarbon soils, but the cleaning efficiencies for inks, dyes, and uncured resins is improved. The toxicity is also reduced. Further decreases in the concentration of the isoparaffins would cause the cleaning efficiency for hydrocarbon soils to be further reduced. Thus in this embodiment, the concentrations range from about 20–80% for ethyl lactate, 5–80% isoparaffins, and from about 0–25% for propylene glycol propyl ether stabilizer.

The foregoing extended range formulations are excellent cleaners for a variety of contaminants and are highly effective in many applications. Some of these formulations are less costly and may be preferred where flammability and toxicity are of less concern.

TABLE V

FORMULATION 1E (EXTENDED RANGE)

| CONPONENT | CONCENTRATION, % BY VOLUME | | |
|---|---|---|---|
| Methyl Lactate or Ethyl Lactate | 20–44 | 45–60 | 61–80 |
| Propylene Glycol Methyl Ether | 56–80 | 40–55 | 20–39 |
| CLEANING EFFICIENCY | | | |
| Hydrocarbon Soils | Good | Fair | Poor |
| Inks and Dyes | Good | Excellent | Excellent |
| Uncured Resins | Good | Excellent | Excellent |
| FLASH POINT, °F. | 96–100 | 101–108 | 109–116 |
| TOXICITY, EXPOSURE LIMIT, PPM | 125 | 150 | 175 |
| EVAPORAITON RATE (Butyl Acetate = 100) | 35 | 25 | 22 |

TABLE VI

FORMULATION 2E (EXTENDED RANGE)

| COMPONENT | CONCENTRATION, % BY VOLUME | | |
|---|---|---|---|
| Methyl Lactate or Ethyl Lactate | 20–24 | 25–75 | 76–80 |
| Propylene Glycol Propyl Ether | 76–80 | 25–75 | 20–24 |
| CLEANING EFFICIENCY | | | |
| Hydrocarbon Soils | Excellent | Excellent | Fair |
| Inks and Dyes | Fair | Good | Excellent |
| Uncured Resins | Good | Good | Excellent |
| FLASH POINT, °F. | 116–117 | 115–116 | 119–121 |
| TOXICITY, EXPOSURE LIMIT, PPM | 175 | 200 | 250 |
| EVAPORATION RATE (Butyl Acetate = 100) | 21 | 20 | 20 |

TABLE VII

FORMULATION 3E (EXTENDED RANGE)

| COMPONENT | CONCENTRATION, % BY VOLUME | | |
|---|---|---|---|
| Ethyl Lactate | 20–49 | 50–70 | 71–80 |
| Isoparaffins | 26–80 | 15–25 | 5–19 |
| Propylene Glycol Propyl Ether (Stabilizer) | 0–25 | 10–25 | 0–25 |
| CLEANING EFFICIENCY | | | |
| Hydrocarbon Soils | Excellent | Good | Fair |
| Inks and Dyes | Poor | Good | Excellent |
| Uncured Resins | Poor | Good | Excellent |
| FLASH POINT, °F. | 111–112 | 111–117 | 115–122 |
| TOXICITY, EXPOSURE LIMIT, PPM | 250–300 | 250–275 | 250–300 |
| EVAPORATION RATE (Butyl acetate = 100) | 15 | 20 | 21 |

We claim:

1. An organic cleaning formulation, comprising:
ethyl lactate, isoparaffins of isoundecane (C11) and isododecane (C12), and a stabilizing agent comprising propylene glycol propyl ether for causing said ethyl lactate and said isoparaffins to be miscible;

said ethyl lactate is present in a concentration range of about 50–70% by volume; said isoparaffins are present in a concentration range of about 15–25% by volume; and said propylene glycol propyl ether is present in a concentration range of about 10–25% by volume.

2. The formulation of claim 1, wherein:

said ethyl lactate is present in a concentration of about 65% by volume; said isoparaffins are present in a concentration of about 20% by volume; and said propylene glycol propyl ether is present in a concentration of about 15% by volume.

3. An organic cleaning formulation, comprising:

ethyl lactate, isoparaffins of isoundecane (C11) and isododecane (C12), and a stabilizing agent comprising propylene glycol propyl ether for causing said ethyl lactate and said isoparaffins to be miscible;

said ethyl lactate is present in a concentration range of about 20–49% by volume; said isoparaffins are present in a concentration range of about 26–80% by volume; and said propylene glycol propyl ether is present in a concentration of not greater than about 25% by volume.

4. An organic cleaning formulation, comprising:

ethyl lactate, isoparaffins of isoundecane (C11) and isododecane (C12), and a stabilizing agent comprising propylene glycol propyl ether for causing said ethyl lactate and said isoparaffins to be miscible;

said ethyl lactate is present in a concentration range of about 71–80% by volume; said isoparaffins are present in a concentration range of about 5–19% by volume; and said propylene glycol propyl ether is present in a concentration of not greater than about 25% by volume.

5. An organic cleaning formulation, comprising:

ethyl lactate, isoparaffins of isoundecane (C11) and isododecane (C12), and a stabilizing agent comprising propylene glycol propyl ether for causing said ethyl lactate and said isoparaffins to be miscible;

said ethyl lactate is present in a concentration range of about 20–80% by volume; said isoparaffins are present in a concentration range of about 5–80% by volume; and said propylene glycol propyl ether is present in a concentration of not greater than about 25% by volume.

* * * * *